(12) United States Patent
Sih et al.

(10) Patent No.: US 7,236,177 B2
(45) Date of Patent: Jun. 26, 2007

(54) PROCESSING DIGITAL VIDEO DATA

(75) Inventors: Gilbert C. Sih, San Diego, CA (US); Yushi Tian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 842 days.

(21) Appl. No.: 10/006,044

(22) Filed: Dec. 4, 2001

(65) Prior Publication Data

US 2003/0106053 A1 Jun. 5, 2003

(51) Int. Cl.
*G06F 12/06* (2006.01)
*G06F 13/00* (2006.01)

(52) U.S. Cl. .................. 345/572; 345/574; 345/537

(58) Field of Classification Search .......... 345/572, 345/537, 562, 547, 574; 348/154, 700, 7
See application file for complete search history.

(56) References Cited

U.S. PATENT DOCUMENTS

| | | | |
|---|---|---|---|
| 5,457,481 A | 10/1995 | Sohn et al. | 345/185 |
| 5,900,865 A | 5/1999 | Howe | 345/191 |
| 6,104,416 A * | 8/2000 | McGuinness | 345/544 |
| 6,301,299 B1 * | 10/2001 | Sita et al. | 375/240.01 |
| 6,313,766 B1 * | 11/2001 | Langendorf et al. | 341/67 |
| 6,335,950 B1 * | 1/2002 | Kohn | 375/240.16 |

FOREIGN PATENT DOCUMENTS

EP 1146746 * 10/2001

* cited by examiner

*Primary Examiner*—Kee M. Tung
*Assistant Examiner*—Hau Nguyen
(74) *Attorney, Agent, or Firm*—Thomas Rouse; Timothy F. Loomis; Timothy E. Buckley

(57) ABSTRACT

In general, the invention is directed toward a device for processing digital video data, such as an encoder, a decoder or an encoder/decoder (CODEC). The device makes use of an innovative architecture in which functionality is partitioned between an embedded processor, a digital signal processor and dedicated hardware to achieve increased performance. In addition, the device includes a programmable video direct memory access (VDMA) controller to retrieve video data from memory in response to a command specifying a multidimensional block of video data.

31 Claims, 6 Drawing Sheets

PROCESSING DIGITAL VIDEO DATA

TECHNICAL FIELD

The invention relates to processing digital video data, such as encoding or decoding digital video data.

BACKGROUND

With recent increases in computer processing capabilities and affordability, full motion digital video devices are becoming more widely available. In particular, digital video capabilities have been incorporated into a wide range of devices including digital televisions, digital direct broadcast systems, wireless communication devices, portable digital assistants (PDAs), laptop computers, and desktop computers. These devices can provide significant improvements over conventional analog video systems in creating, modifying, transmitting, storing, and playing full motion video sequences.

Various video compression standards or processes have been established for communicating digital video sequences. The Moving Picture Experts Group (MPEG), for example, has developed a number of standards including MPEG-1, MPEG-2 and MPEG-4. Other standards include QuickTime™ technology developed by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac Inc.

Many of these standards achieve increased transmission rates by exploiting data compression. The MPEG standards, for example, utilize a graphics and video compression algorithm designed to transmit video and images over a narrower bandwidth. In particular, the MPEG standards incorporate video compression techniques that utilize similarities between successive image frames, referred to as temporal or interframe correlation, to provide interframe compression. The interframe compression techniques exploit data redundancy across frames by converting pixel-based representations of image frames to motion representations. In addition, the video compression techniques use similarities within image frames, referred to as spatial or intraframe correlation, allowing for intraframe compression in which the motion representations within an image frame can be further compressed. The intraframe compression is typically based upon conventional processes for compressing still images, such as discrete cosine transform (DCT) encoding.

To support the compression techniques, many digital video devices include an encoder/decoder (CODEC) for compressing and decompressing the digital video sequences. The CODEC operates on blocks of pixels within the sequence of video images. For MPEG, for example, the CODEC typically divides a video image frame to be transmitted into macroblocks comprising smaller image blocks. For each macroblock in the image frame, the CODEC searches the immediately preceding video frame to identify the most similar macroblock, and encodes the difference between the macroblocks for transmission, along with a motion vector that indicates which macroblock from the previous frame was used for encoding. The decoder receives the motion vector and encoded video data, and performs motion compensation to generate video sequences.

SUMMARY

In general, the invention is directed to processing digital video data, such as encoding or decoding digital video data. In one embodiment, the invention is directed to a system comprising a memory having a plurality of linearly addressable storage units to store video data, and a programmable video direct memory access (VDMA) controller to access the storage units of the memory in response to a command specifying a multidimensional block of video data. The command may, for example, specify a number of rows and a number of columns for the block of video data, and a jump parameter indicating a number of storage units between each row of the video block. In this manner, the VDMA controller is capable of fetching an entire block of video data having multiple non-contiguous rows in response to a single direct memory access (DMA) command. Accordingly, the microprocessor can access a block of video data with a reduced number of address calculations.

In another embodiment, the invention is directed to a method comprising receiving a direct memory access (DMA) command from a processor to transfer a multidimensional block of video data, and generating a set of source addresses and a set of destination addresses in response to the command. The method further comprises copying video data from a source memory to a destination memory according to the source addresses and destination addresses.

In another embodiment, the invention is directed to a device to process digital video data. The device comprises a first memory to store a candidate video block to be encoded, and a second memory to store a set of video data blocks from which to encode the candidate video block. The device further comprises a differential calculator to calculate differential metrics between the candidate video block and the set of video blocks.

The details of one or more embodiments of the invention are set forth in the accompanying drawings and the description below. Other features, objects, and advantages of the invention will be apparent from the description and drawings, and from the claims.

DETAILED DESCRIPTION

In general, the invention is directed to processing digital video data, such as encoding or decoding digital video data. A device, such as an encoder, a decoder or an encoder/decoder (CODEC) includes an innovative architecture in which functionality is partitioned between an embedded processor, a digital signal processor and dedicated hardware to achieve increased performance. Furthermore, these and other components of the device make use of a unique memory structure that supports commands for directly accessing blocks of video data.

By partitioning the encoding and decoding functions between an embedded processor, a digital signal processor and dedicated hardware, the device is able to achieve high encoding and decoding rates. Furthermore, the embedded processor and the DSP perform all functionality specific to a particular compression standard, while the dedicated hardware is optimized to perform specific computations that are common to most standards. In this manner, the device is able to achieve high performance while remaining easily upgradeable to support future video compression standards.

Furthermore, by making use of a programmable video direct memory access (VDMA) controller that supports commands for directly accessing blocks of video data, the components can access a block of video data without having to perform the high number of address calculations. In other words, the components can write data to and read data from the memory structure using commands that specify blocks of video data instead of conventional linear storage addresses. Consequently, the components can access a block of video data without having to perform the high number of address calculations that is typically required to access video data due to the non-sequential manner in which video data is typically stored.

Figure 1:
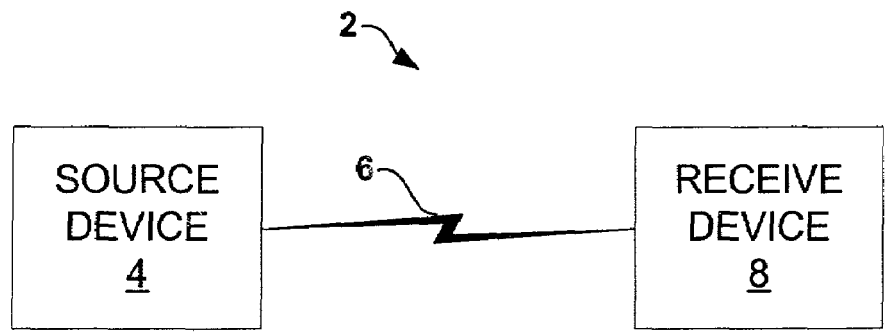
FIG. 1 is a block diagram illustrating an example system in which a source device transmits an encoded sequence of video data to a receive device.

FIG. 1 is a block diagram illustrating an example system 2 in which a source device 4 transmits an encoded sequence of video data 6 to a receive device 8. In particular, source device 4 encodes and transmits video data 6 using any one of a variety of video compression standards. Examples of such standards include MPEG developed by the Moving Picture Experts Group, QuickTime™ technology developed by Apple Computer of Cupertino Calif., Video for Windows™ developed by Microsoft Corporation of Redmond, Wash., Indeo™ developed by Intel Corporation, and Cinepak™ developed by SuperMac Inc.

Source device 4 may be any device capable of encoding and transmitting video data 6. Similarly, receive device 8 may be any device capable of receiving and decoding video data 6. Example devices for source device 4 and receive device 8 include servers located on a computer network, workstations or other desktop computing devices, and mobile computing devices such as a laptop computers. Other examples include digital television broadcasting satellites and receiving devices such as digital televisions, digital video cameras or other recording devices, digital video telephones, wireless video devices, and the like.

Consequently, source device 4 and receive device 8 typically each include an encoder/decoder (CODEC) (not shown) for encoding and decoding digital video data 6. The CODEC of source device 4, for example, operates on blocks of pixels within the sequence of video images in order to encode the video data. In particular, the CODEC of source device 4 divides a video image frame to be transmitted into macroblocks comprising a number of smaller image blocks. For each macroblock in the image frame, the CODEC of source device 4 searches the preceding video frame already transmitted to identify the most similar macroblock, and encodes the difference between the macroblocks, along with a motion vector that identifies the macroblock from the previous frame that was used for encoding. The CODEC of receive device 8 receives the motion vector and the encoded video data, and performs motion compensation to generate video sequences for display to a user. Source device 4 and receive device 8 need not each include a CODEC. For example, source device 4 may include an encoder, and receive device 8 may include a decoder.

The CODEC of source device 4, the CODEC of receive device 8, or both include an innovative architecture for encoding and decoding video data. In this manner, the invention is not limited to devices for transmitting encoded video data, or to devices for receiving the encoded video data. The encoding and decoding functionality is partitioned between an embedded processor, a digital signal processor and dedicated hardware. Furthermore, these and other components of the CODEC make use of a unique memory structure that supports commands for directly accessing blocks of video data. In other words, the components can write data to and read data from the memory structure using commands that specify blocks of video data instead of conventional linear storage addresses. Accordingly, the components can access a block of video data without having to perform the high number of address calculations that is typically required to access video data due to the non-sequential manner in which video data is typically stored.

Figure 2:
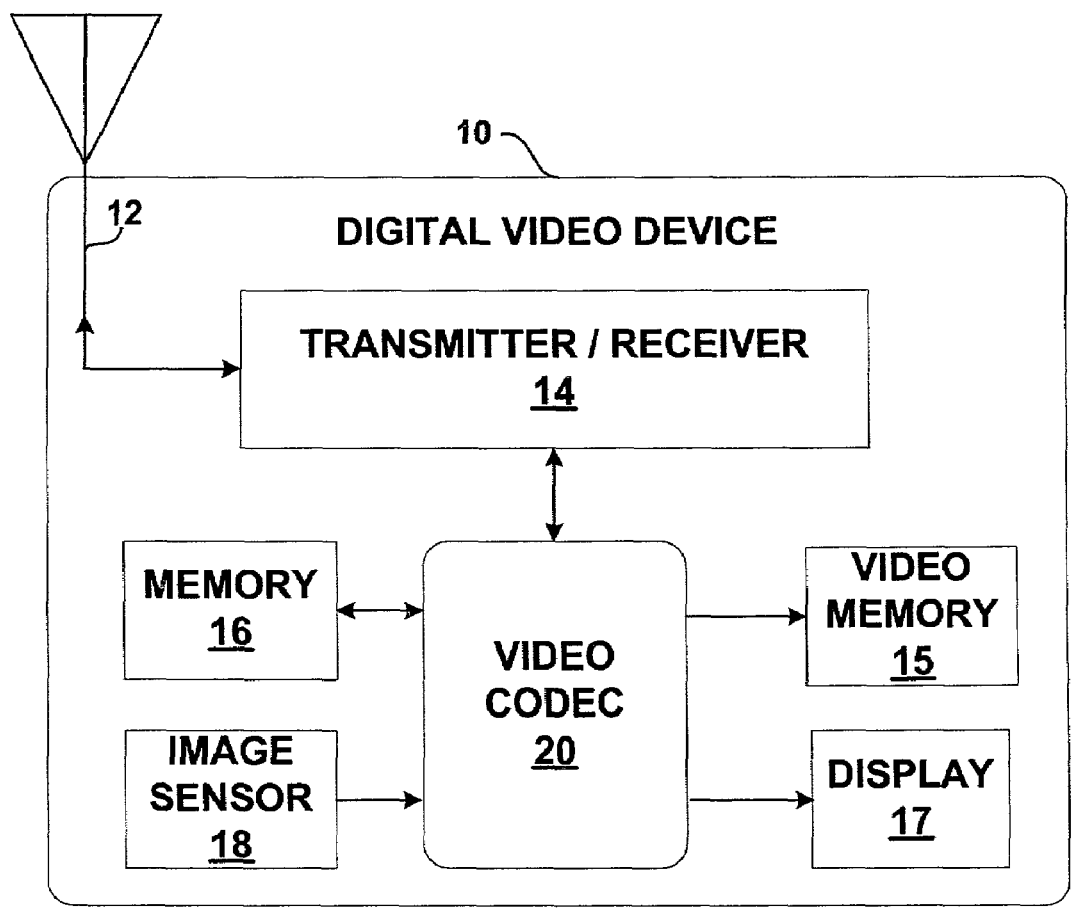
FIG. 2 is a block diagram illustrating an example digital video device incorporating a video encoder/decoder (CODEC) that compresses and decompresses digital video sequences according to the principles of the invention.

FIG. 2 is a block diagram illustrating an example digital video device 10, such as source device 4 or receiving device 6, incorporating a video encoder/decoder (CODEC) 20 that compresses and decompresses digital video sequences according to the principles of the invention. Exemplary digital video device 10 is illustrated as a wireless device, such as a mobile computing device, a personal digital assistant (PDA), a wireless communication device, and the like. However, the principles of the invention are not limited to wireless devices, and may be readily applied to other digital video devices. Furthermore, although illustrated in reference to a CODEC, the invention is not so limited and may readily be applied to encoders and decoders.

Digital video device 10 receives compressed digital video sequences via antenna 12 and transmitter/receiver 14. CODEC 20 decodes the video sequences and stores the video sequences in video memory 15. CODEC 20 displays the decoded video sequences on display 17, which may comprise a liquid crystal display (LCD) or other output device. In addition, CODEC 20 may encode digital video sequences captured by image sensor 18. CODEC 20 buffers the encoded digital video sequences within video memory 15 prior to transmission via transmitter/receiver 14 and antenna 12. Memory 16 stores instructions and data for use by CODEC 20. Memories 15, 16 may comprise synchronous dynamic random access memory (SDRAM) and the like.

As described in detail below, CODEC 20 includes an innovative architecture for encoding and decoding video data. As a result, digital video device 10 may achieve high transfer rates for video data, such as 1.5 megabits per second or more.

Figure 3:
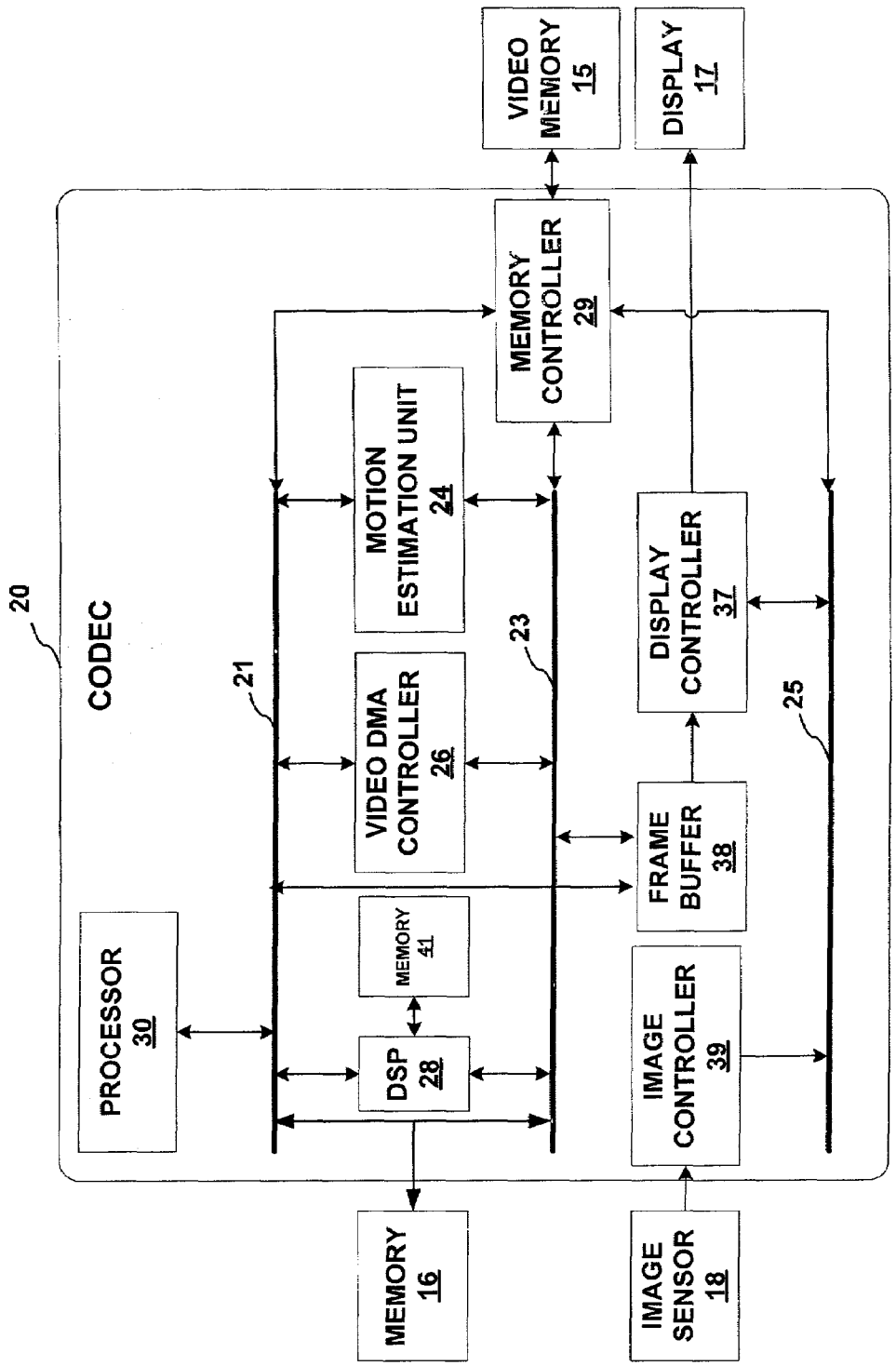
FIG. 3 is a block diagram illustrating an example embodiment of the CODEC in further detail.

FIG. 3 is a block diagram illustrating an example embodiment of CODEC 20 of digital video device 10 in further detail. In general, CODEC 20 partitions the tasks of encoding and decoding between embedded processor 30, digital signal processor (DSP) 28 and motion estimation unit 24. Although illustrated as a single application-specific integrated circuit (ASIC) having a number of components, the principles described herein may readily be implemented using multiple discrete components.

Processor 30 provides primary control over all of the components of CODEC 20, and coordinates communication with the other components of digital video device 10. Processor 30 directs DSP 28 to perform many of the computationally intensive tasks required for encoding and decoding digital video sequences. For some tasks, DSP 28 may in turn engage motion estimation unit 24, which includes dedicated hardware, for performing motion estimation. As discussed above, memory 16 stores instructions and data for use by processor 30, while video memory 15 stores video data. As illustrated, memories 15, 16 may be external to CODEC 20 and coupled to processor 30 via processor bus 21.

Processor 30 configures and controls DSP 28 via processor bus 21. DSP 28 has a dedicated memory 41 for storing instructions and data, but can also access memories 15, 16 via DSP bus 23. The use of a separate DSP bus 23 allows DSP 28 and processor 30 to simultaneously access various components of CODEC 20, thereby increasing the overall bandwidth of digital video device 10. For example, DSP 28 can access video memory 15 while processor 30 accesses memory 16. Memory controller 29 arbitrates access to video memory 15 between processor bus 21, DSP bus 23 and input/output (I/O) bus 25.

I/O bus 25 couples processor 30 and DSP 28 to a number of different peripherals, such as display 17 and image sensor 18. Processor 30 and DSP 28 may, for example, provide decoded video data to frame buffer 38 for output to display 17 via display controller 37. In addition, processor 30 may direct image controller 39 to capture video data from image sensor 18, and store the video data within video memory 15.

Processor 30 and DSP 28 make use of Video Dynamic Memory Access (VDMA) controller 26 to facilitate the efficient encoding and decoding of video data. In particular, processor 30 and DSP 28 issue VDMA controller 26 access commands specifying multidimensional blocks of video data, which VDMA controller 26 translates into single dimensional storage addresses. VDMA controller 26 resides on both processor bus 21 and DSP bus 26, and is capable of transferring data between any memory of CODEC 20 including external memory 16, video memory 15, DSP memory 41, and memory (not shown) within motion estimation unit 24. In response to a command from DSP 28, for example, VDMA controller 26 may copy one or more blocks of video data from video memory 15 to motion estimation unit 24.

Unlike conventional DMA controllers that read a single row of memory at a time, VDMA controller 26 fetches multidimensional video blocks of a frame without having to be reprogrammed between rows. In addition, VDMA controller 26 is capable of fetching non-square blocks of video data. In this manner, VDMA saves processor 30, DSP 28 and the other components of CODEC 20 from performing the high-number of address calculations that is typically required to access video data due to the non-sequential manner in which video data is typically stored.

Processor 30 and DSP 28 program VDMA controller 26 by issuing commands that include a set of parameters specifying the block to transfer. For example, a single command may specify the following parameters:

Video block width—Width of the data block in bytes (number of columns).

Video block length—Length of the data block in bytes (number of rows).

Source memory start address—Starting address to read the data from the source memory, typically the upper left pixel in the block to be transferred.

Destination memory start address—Starting address to write the data within the destination memory.

Jump interval—An address jump parameter indicating the number of addresses between the end of a row and the start of the next row in bytes.

Source memory word width—Number of bytes per word in the source memory.

Destination memory word width—Number of bytes per word in the destination memory.

Zero-pad flag—A boolean flag controlling whether to pad data with zeros.

In the above parameter list, the video block width and video block length are used to define the dimensions of the desired rectangular block in bytes. The source and destination memory word widths allow VDMA controller 26 to determine whether data packing is necessary when transferring the data. For example, if the source memory is eight bits wide and the destination memory is sixty-four bits wide, VDMA controller 26 reads eight bytes from the source memory and packs them into a sixty-four bit word to be written to the destination memory.

Figure 4:
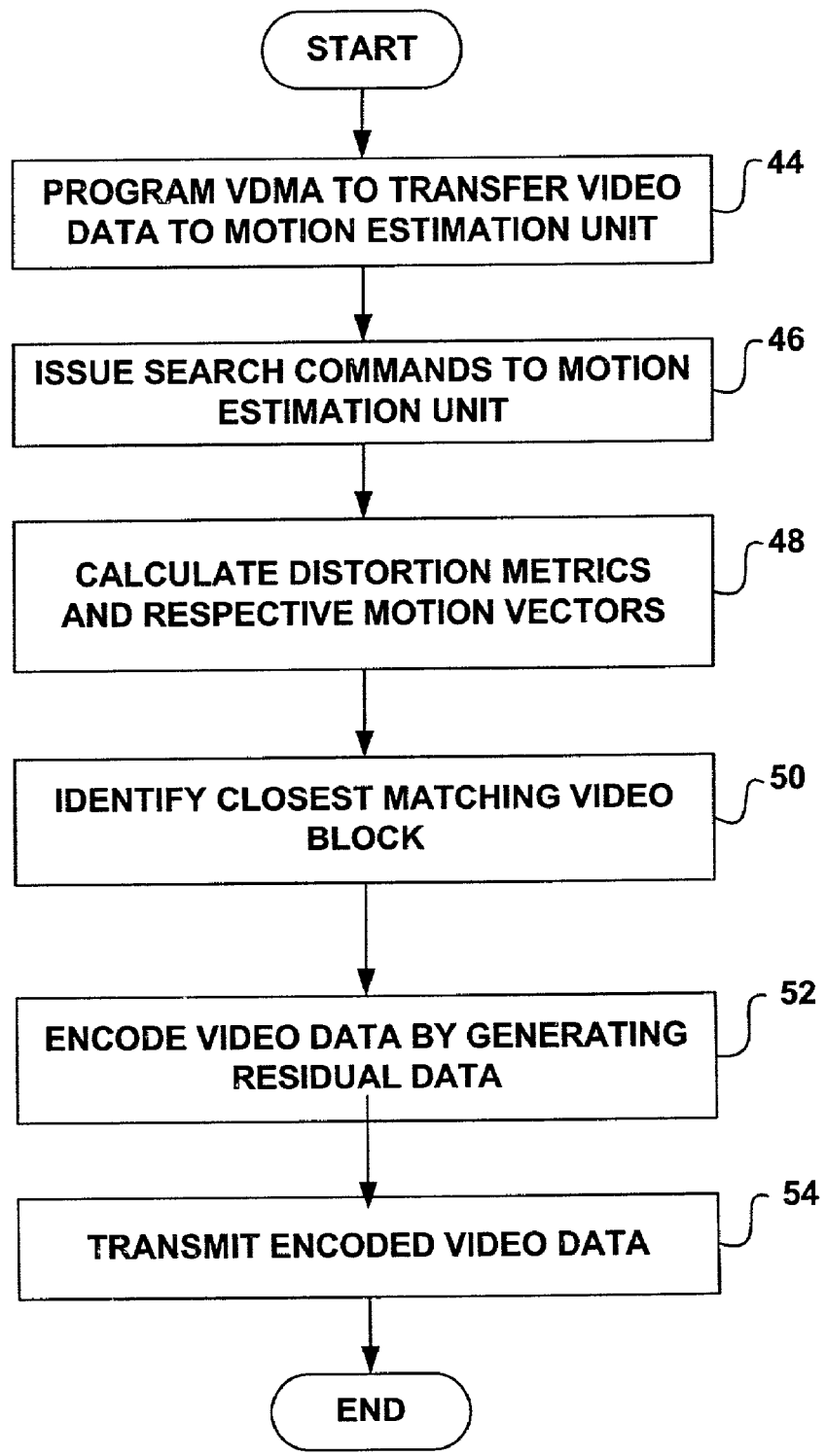
FIG. 4 is a flowchart illustrating a process of encoding video sequences according to the principles of the invention.

FIG. 4 is a flowchart illustrating the process of encoding video sequences by removing temporal redundancy between frames. Under the direction of processor 30, DSP 28 programs VDMA controller 26 to fetch video data from video memory 15 to motion estimation unit 24 (44). Specifically, DSP 28 issues video block move commands to VDMA controller 26 that specify one or more blocks of video data within video memory 15. In response, VDMA controller 26 performs all address calculations necessary to transfer non-contiguous video data from video memory 15 to internal memory of motion estimation unit 24. For example, in response to commands issued by DSP 28, VDMA controller 26 may transfer a current video block to be transmitted as well as the previously transmitted video frame from video memory 15 to motion estimation unit 24.

The encoding process is partitioned between DSP 28 and motion estimation unit 24. In particular, DSP 28 carries out the encoding algorithms, but makes use of motion estimation unit 24 to perform generalized data processing functions. Consequently, unlike a conventional approach in which the entire search algorithm is implemented within a dedicated hardware unit, the software executing on DSP 28 may readily be changed without requiring changes to motion estimation unit 24.

For example, during the encoding process, DSP 28 issues commands directing motion estimation unit 24 to search the previously transmitted video frame to identify the video block that is most similar to the current video block to be encoded (46). The commands specify all information necessary to select and compare the current block with the blocks of the previous video frame. Furthermore, the commands conform to a generalized format that may readily be used with any conventional searching algorithm. A command, for example, may specify the (X, Y) coordinates of the upper left corner of a search space, the (X, Y) coordinates of a lower right left corner of the search space, and a jump value indicating the distance from the end of a row to the start of the next row in bytes.

In response to the commands, motion estimation unit 24, compares the current video block to be encoded with blocks of the previous frame and outputs a set of distortion metrics for the blocks as well as respective motion vectors (48). The distortion metrics provide relative indications of differences between the block to be transmitted and the various blocks of the previous frame. Motion estimation unit 24 may perform the calculations in parallel, and may produce a distortion metric for each of the blocks within the search space.

To calculate the distortion metrics, motion estimation unit 24 may perform any one of a number of algorithms using the previously transmitted video frame and the current block to be encoded. Motion estimation unit 24 may, for example, calculate the Sum of the Absolute Differences (SAD) or the Sum of the Squared Differences (SSD) between the block to be encoded and blocks within the previous video frame. Alternatively, motion estimation unit 24 may calculate a Mean Square Error (MSE) or perform a Normalized Cross Correlation Function (NCCF) between the video data.

Based on the distortion metrics, DSP 28 identifies the closest matching block or blocks within the search space (50). For MPEG encoded video data, for example, DSP 28 may select a motion vector indicating a closest macroblock, or four motion vectors indicating four blocks. Once DSP 28 determines the closest matching block, DSP 28 performs a number of image processing functions to encode the data (52). For example, DSP 28 performs motion compensation by subtracting the selected block from the block to be transferred. In addition, DSP 28 performs discrete cosine transformation (DCT) to pack signal energy into coefficients and quantization to reduce the number of bits to encode. Processor 30 performs scanning to convert two-dimensional coefficient data to one dimension for transmission, and bit stream encoding to add headers and compression parameters. Finally, processor 30 of interacts with transmitter/receiver 14 to transmit the encoded data generated by DSP 28 (54).

In this manner, CODEC 20 partitions the tasks of motion estimation and video compression between the processor 30, DSP 28 and motion estimation unit 24. In particular, processor 30 operates in a high-level supervisory role, DSP 28 handles the computationally intensive encoding algorithms, and motion estimation unit 24 performs high-speed searches using dedicated hardware. This partitioning allows CODEC 20 to achieve high performance while remaining easily upgradeable to support future video compression standards. In addition, the computational load of processor 30, as well as the power consumption of CODEC 20, can be significantly lower than a conventional approach in which the searching techniques are implemented entirely by an embedded processor.

Figure 5:
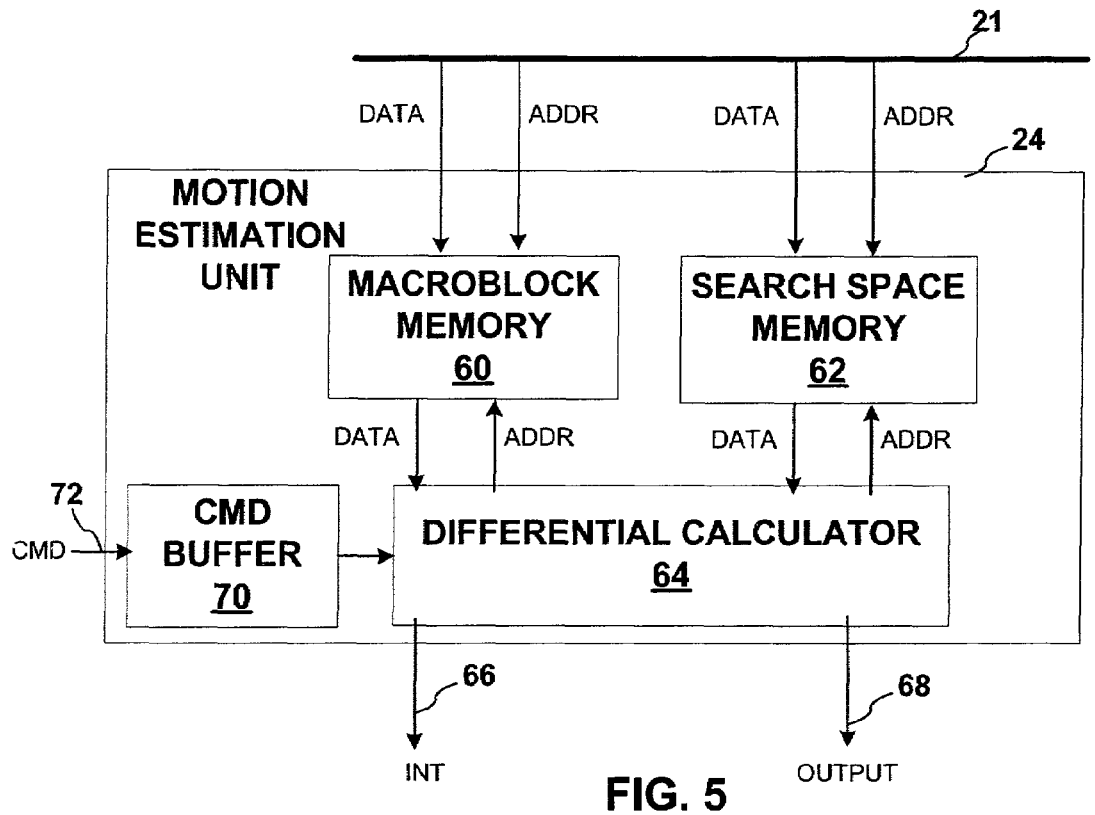
FIG. 5 is a block diagram illustrating an example embodiment of a motion estimation unit.

FIG. 5 is a block diagram illustrating an example embodiment of motion estimation 24 unit in further detail. Motion estimation unit 24 includes two internal high-speed memories 60, 62 for caching the current block to be encoded and the video data for use in differentially encoding the current block. In particular, motion estimation unit 24 includes block memory 60 to store the current block to be encoded. In addition, motion estimation unit 24 includes search space memory 62 to store all of the data from which to identify the closest video block already transmitted. In an embodiment to support MPEG, for example, block memory 60 may store a macroblock to be transmitted while search space memory 62 may store a plurality of previously transmitted macroblocks, such as a previously transmitted video frame. In this arrangement, a typical block may consist of 8×8 bytes, a macroblock may consist of 16×16 bytes, and a search space may consist of 48×48 bytes.

Differential calculator 64 includes address generation logic for retrieving video data from memories 60, 62. During the encoding process, VDMA controller 26 fetches the current block from video memory 15 and stores the current block within memory 60. In addition, VDMA controller 26 fetches a search space within the previous video frame and stores the video data within search space memory 62. Accordingly, DSP 28 programs VDMA controller 26 to transfer the specified video data to the respective internal memories 60, 62 of motion estimation unit 24. Specifically, DSP 28 issues video block move commands to video VDMA controller 26 that specify blocks of non-contiguous video data within video memory 15, as well as other necessary parameters such as the word widths of memories 15, 60, 62, to allow VDMA controller 26 to correctly transfer non-sequential video data between the memories 15, 60, 62.

Upon receiving a search command 72 from DSP 28, differential calculator 64 retrieves the video data stored within memories 60, 62, and performs pixel-wise comparisons between the video data to calculate one or more differential metrics. Each search command 72 specifies a multidimensional region of video data within memory 62 for use in generating a differential metric. As an example, each search command 72 may specify an upper left corner and a lower right corner of the region within memory 62.

Consequently, DSP 28 may direct differential calculator 64 to use the video data stored by memories 60, 62 a number of times during execution of the motion estimation algorithms. By internally caching the current block to the encoded as well as the entire search space within memories 60 and 62, respectively, motion estimation unit 24 need not access video memory 15 between searches. Consequently, CODEC 20 can achieve increased encoding speeds relative to conventional architectures.

To calculate the differential metrics, differential calculator 64 may implement any one of a number of algorithms to produce an output indicative of the differences between the current block stored within memory 60 and various blocks within search space memory 62. As described above, differential calculator 64 may implement the Sum of the Absolute Differences (SAD) or the Sum of the Squared Differences (SSD) between the block to be encoded and blocks within the previous video frame. Alternatively, differential calculator 64 may perform a Mean Square Error (MSE) or a Normalized Cross Correlation Function (NCCF).

Upon calculating the differential measurements and motion vectors, differential calculator 64 asserts interrupt (INT) 66 to signal DSP 28 of the pending results. To reduce the number of interrupts, motion estimation unit 24 includes command (CMD) buffer 70 that stores search commands 72 received from DSP 28. CMD buffer 70 may comprise, for example, a first-in first-out (FIFO) queue for buffering received commands. In this manner, DSP 28 can specify a plurality of searches to be performed by motion estimation unit 24 prior to reporting the results.

Figure 6:
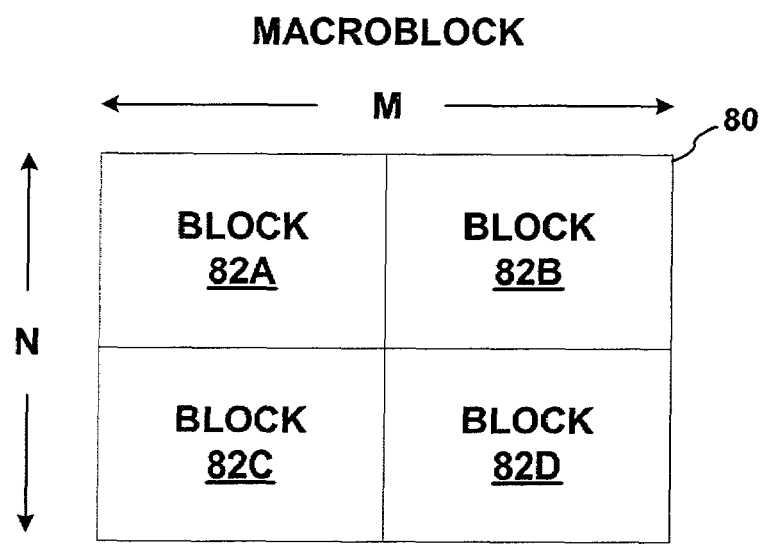
FIG. 6 illustrates an example macroblock of video data as stored within a memory.

FIG. 6 illustrates an example macroblock 80 as stored within memory 60. As noted above, this implementation may be useful for MPEG and other video compression schemes that make use of macroblocks. In particular, macroblock 80 includes four blocks of video data 82A through 82D. In this embodiment, the address generation logic of differential calculator 64 is configured to access any of the four blocks 82. Consider an example arrangement in which each block 82 is 8 bytes (M/2) wide and 8 bytes (N/2) in length, and macroblock memory 60 has a word width of 8 bytes. In this arrangement, the rows of block 82A and block 82B will alternate within memory 60, followed by alternating rows of block 82C and 82D. Consequently, in order to compute differential metrics for each block 82, the address generation logic of differential calculator 64 generates addresses to fetch the individual blocks 82, either sequentially or in parallel.

Figure 7:
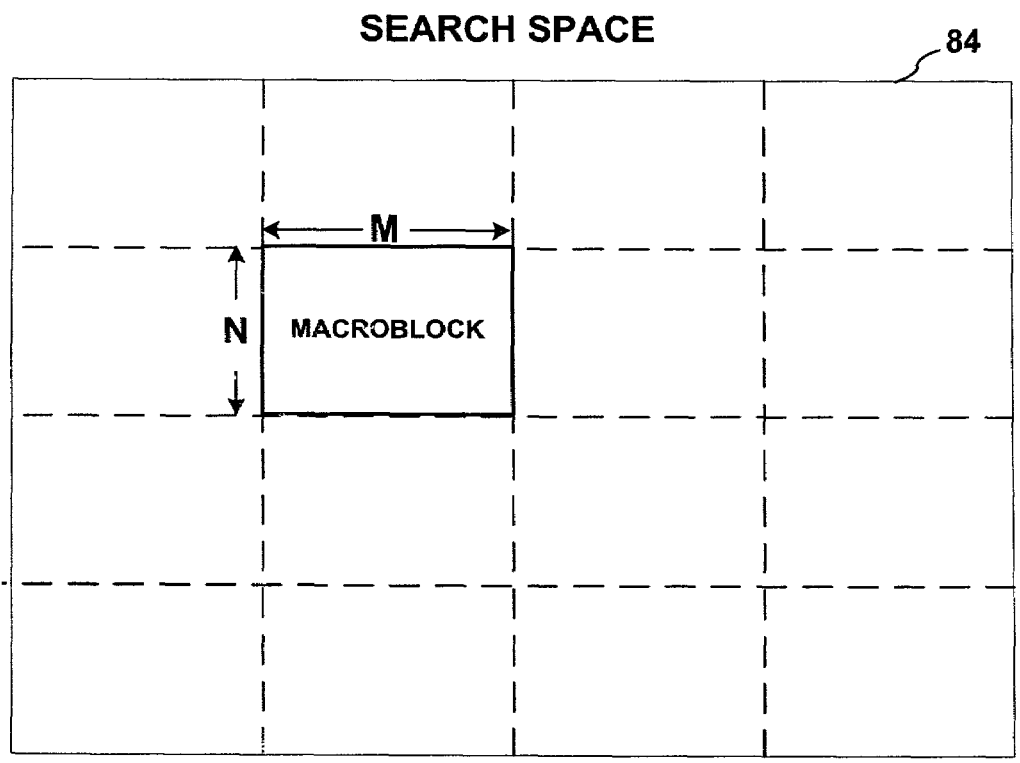
FIG. 7 illustrates an example search space stored within a memory.

FIG. 7 illustrates an example search space 84 stored within search space memory 62 that may be useful for use with MPEG and other video compression schemes. In particular, search space 84 stores video data, any portion or portions of which can be used for differential calculation.

In one arrangement, the address generation logic of differential calculator 64 generates addresses to fetch M*4 contiguous bytes from search space memory 62. This may allow for calculating differential metrics for multiple candidate blocks in parallel.

Figure 8:
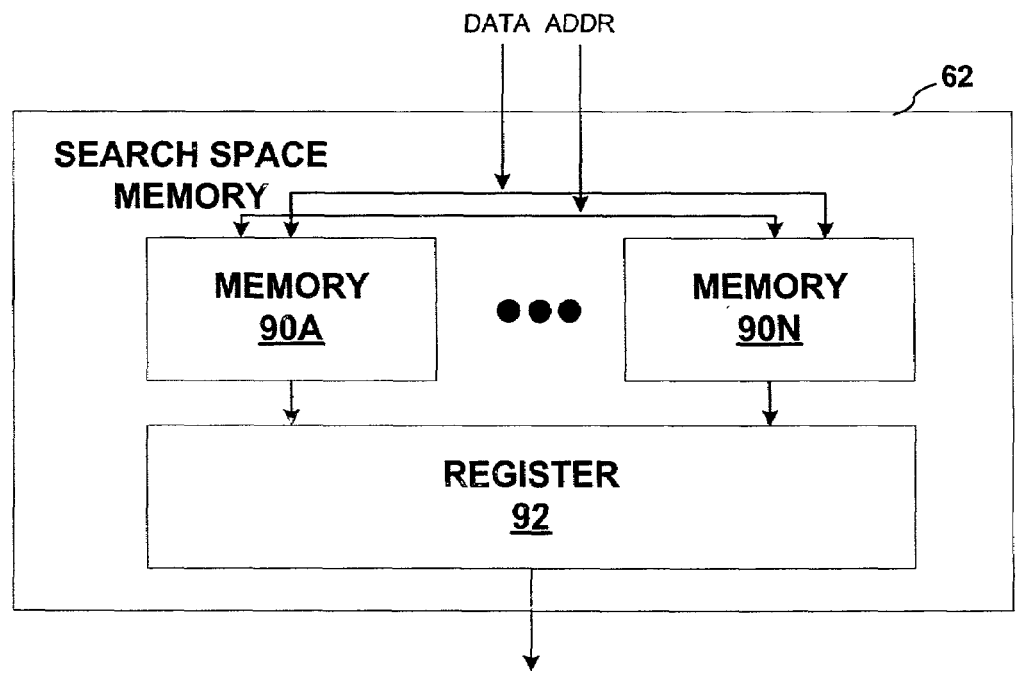
FIG. 8 illustrates an example arrangement of a memory for storing a search space having macroblocks of M by N dimensions.

FIG. 8 illustrates an example arrangement of search space memory 62 for storing a search space having macroblocks of M by N dimensions, as illustrated in FIG. 7. In particular, search space memory 62 includes M byte-wide memories 90. In a single cycle, register 92 receives M bytes from memories 90 and concatenates the bytes prior to delivering the retrieved data to differential calculator 64. This allows differential calculator 64 to fetch an entire row of video data from one of the blocks of the macroblock in a single clock cycle. To fetch an entire block, the address generation logic of differential calculator 64 jumps the address after every access because successive rows of the block are not contiguous in the memories 90.

Figure 9:
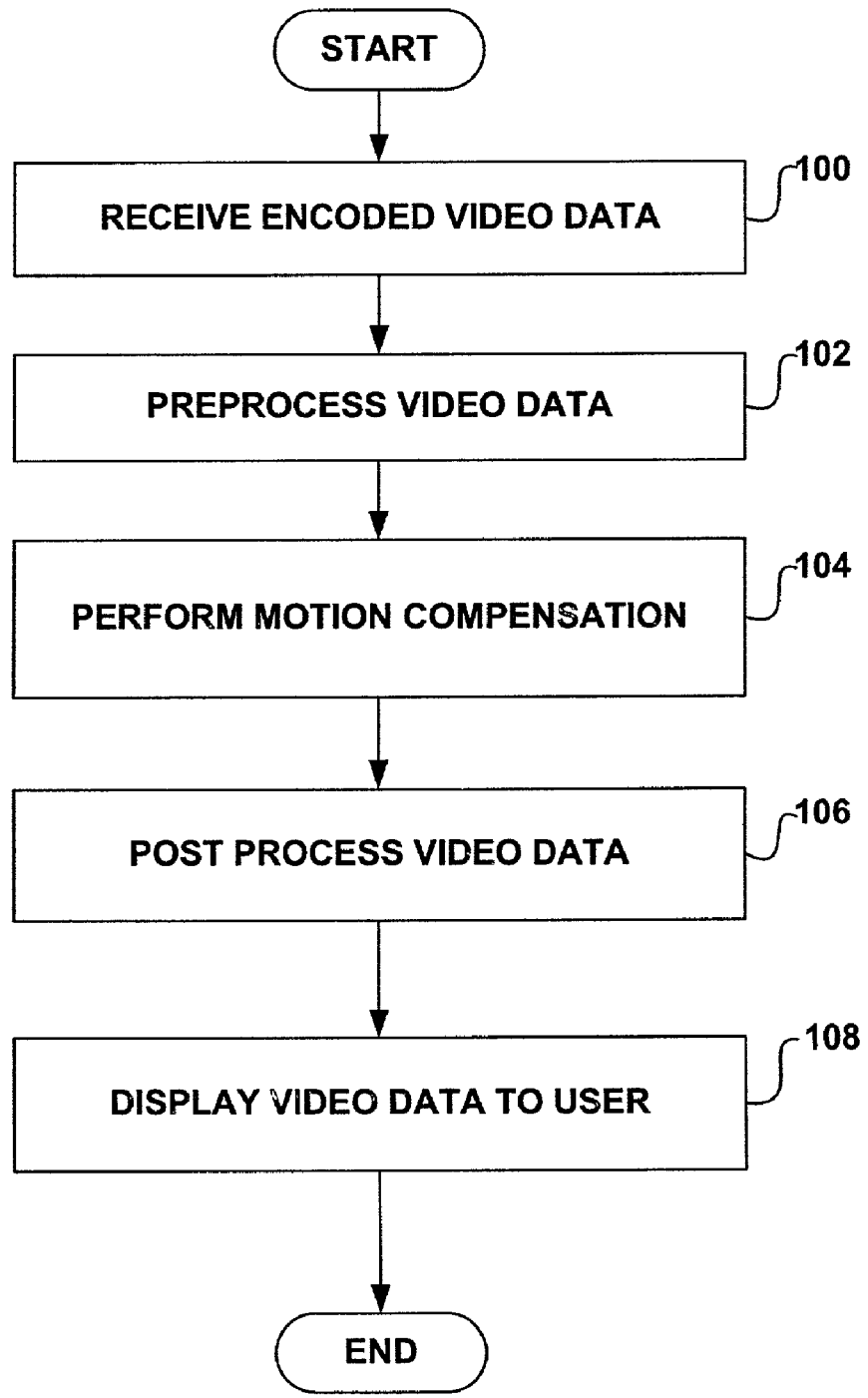
FIG. 9 is a flowchart illustrating a process of decoding video sequences according to the principles of the invention.

FIG. 9 is a flowchart illustrating the process of decoding video sequences according to the principles of the invention. Processor 30 or CODEC 20 receives encoded video sequences via transmitter/receiver 14 and antenna 12 (100). Processor 30 then preprocesses the video data by unpacking the received bit stream, and performing inverse quantization and inverse discrete cosine transformation (IDCT) (102).

Next, processor 30 performs motion compensation by applying the received motion vectors, if any, to previously received video data (104). During this process, processor 30 makes use of VDMA controller 26 to retrieve previously transmitted data from video memory 15 using block commands. Similarly, processor 30 may direct VDMA controller 26 to transfer the resultant video data to video memory 15.

Next, processor 30 directs DSP 28 to post-process the video data to remove any blocking effects introduced by the compression algorithm, and to perform any necessary color conversion (106). DSP 28 may make use of VDMA to retrieve the video data from video memory 15, and to store the post-processed video data to video memory 15.

Finally, processor 30 directs display controller 37 to present the decoded video data to display 17 for viewing by a user. Specifically, processor 30 may invoke VDMA controller 26 to transfer the decoded video data from video memory 15 to frame buffer 38.

Various embodiments of the invention have been described. These and other embodiments are within the scope of the following claims.

The invention claimed is:

1. A system comprising:
   a memory having linearly addressable storage units to store video data; and
   a programmable video direct memory access (VDMA) controller to access the storage units of the memory in response to a command specifying a multidimensional block of video data and fetch the multidimensional block of video data from multiple non-contiguous rows of the memory in response to the command, wherein the command specifies a jump parameter indicating a number of storage units between each row of the block of video data.

2. The system of claim 1, wherein the command specifies a number of rows and a number of columns for the block of video data.

3. The system of claim 1, wherein in response to the command, the VDMA controller copies the video data from the memory to a destination memory.

4. The system of claim 3, wherein the command specifies a starting address of the video block within the memory, and a starting address within the destination memory.

5. The system of claim 1, further comprising:
   a processor to issue commands to the VDMA controller via a first bus; and
   a digital signal processor to issue commands to the VDMA controller via a second bus.

6. The system of claim 1, further comprising a motion estimation unit having an internal memory and a differential calculator to calculate a distortion metric between blocks of video data, wherein the VDMA controller copies blocks of video data from the memory to the internal cache of the motion estimation unit in response to the command.

7. A method comprising:
   receiving a direct memory access (DMA) command from a processor to transfer a multidimensional block of video data, wherein the command specifies a jump parameter indicating a number of storage units between each row of the block of video data;
   generating a set of source addresses and a set of destination addresses for the multidimensional block of video data in response to the command, wherein the set of source addresses correspond to multiple non-contiguous rows of the source memory; and
   copying video data from the source memory to a destination memory according to the source addresses and destination addresses in response to the command.

8. The method of claim 7, wherein the source memory and the destination memory each have linearly addressable storage units.

9. The method of claim 7, wherein the command specifies a number of rows and a number of columns for the block of video data, and wherein generating a set of addresses comprises calculating the source addresses and destination addresses as a function of the number of rows and the number of columns.

10. The method of claim 7, wherein generating a set of addresses comprises calculating the source addresses and destination addresses as a function of the jump parameter.

11. The method of claim 7, wherein the command specifies a starting source address of the video block within the source memory, and a staffing destination address within the destination memory.

12. The method of claim 7, wherein copying video data comprises fetching an entire block of video data having multiple rows in response to the command.

13. The method of claim 7, wherein receiving the command comprises receiving the command via a first bus, the method further comprising receiving a second command from a digital signal processor via a second bus.

14. The method of claim 7, wherein copying video data comprises copying the video data to an internal cache of a motion estimation unit in response to the command.

15. A device comprising:
   a first memory to store a candidate video block to be encoded;
   a second memory to store a set of video data blocks from which to encoded the candidate video block;

a differential calculator to calculate differential metrics between the candidate video block and the set of video blocks; and a programmable video direct memory access (VDMA) controller to copy the candidate video block and the set of video blocks from a video memory to the first memory and the second memory, respectively, wherein the VDMA controller copies the set of blocks to the second memory in response to a single direct memory access (DMA) command specifying a multidimensional search space of video data stored within the video memory in multiple non-contiguous rows, wherein the command specifies a jump parameter indicating a number of storage units between each row of the block of video data.

16. The device of claim 15, wherein the set of video data blocks stored by the second memory comprises a complete video data frame.

17. The device of claim 15, wherein the differential calculator include address generation logic to read the candidate video block from the first memory and one or more video blocks of the set of video blocks from the second memory.

18. The device of claim 17, wherein the differential calculator reads the candidate video block from the first memory and one or more video blocks of the set of video blocks from the second memory in parallel.

19. The device of claim 15, wherein the command specifies a number of rows and a number of columns for the search space of video data.

20. The device of claim 15, wherein the video memory includes a plurality of linearly addressable storage units to store video data.

21. The device of claim 15, wherein the command specifies a staffing source address of the search space within the video memory, and a starting destination address within the second memory.

22. The device of claim 15, further comprising:
a processor to issue commands to the VDMA controller via a first bus; and
a digital signal processor (DSP) to issue commands to the VDMA controller via a second bus.

23. The device of claim 15, wherein the differential calculator calculates the differential metrics in response to search commands, and wherein each search command specifies a multidimensional region of video data stored within the second memory.

24. The device of claim 23, further comprising a command buffer to store the search commands and deliver the search commands to the differential calculator.

25. A device comprising:
means for receiving a direct memory access (DMA) command from a processor to transfer a multidimensional block of video data, wherein the command specifies a jump parameter indicating a number of storage units between each row of the block of video data;

means for generating a set of source addresses and a set of destination addresses for the multidimensional block of video data in response to the command, wherein the set of source address correspond to multiple non-contiguous rows of a source memory; and means for copying video data from the source memory to a destination memory according to the source addresses and destination addresses.

26. The device of claim 25, wherein the source memory and the destination memory each have linearly addressable storage units.

27. The device of claim 25, wherein the command specifies a number of rows and a number of columns for the block of video data, and wherein the generating means comprises means for calculating the source addresses and destination addresses as a function of the number of rows and the number of columns.

28. The device of claim 25, wherein the generating means comprises means for calculating the source addresses and destination addresses as a function of the jump parameter.

29. The device of claim 25, wherein the command specifies a staffing source address of the video block within the source memory, and a staffing destination address within the destination memory.

30. The device of claim 25, wherein the receiving means receives the command via a first bus and a second command from a digital signal processor via a second bus.

31. The device of claim 25, wherein the copying means comprises means for copying the video data to an internal cache of a motion estimation unit in response to the command.

* * * * *